J. T. STARR & B. M. McFARLAND.
FISHING TOOL.
APPLICATION FILED FEB. 6, 1911.
1,006,020.
Patented Oct. 17, 1911.
2 SHEETS—SHEET 1.
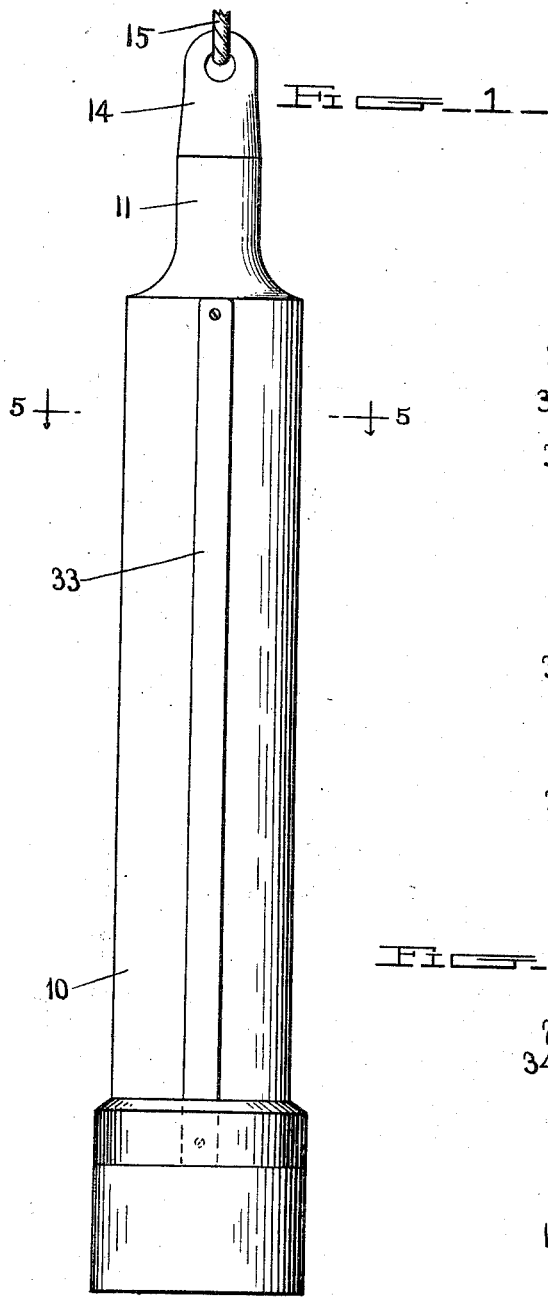
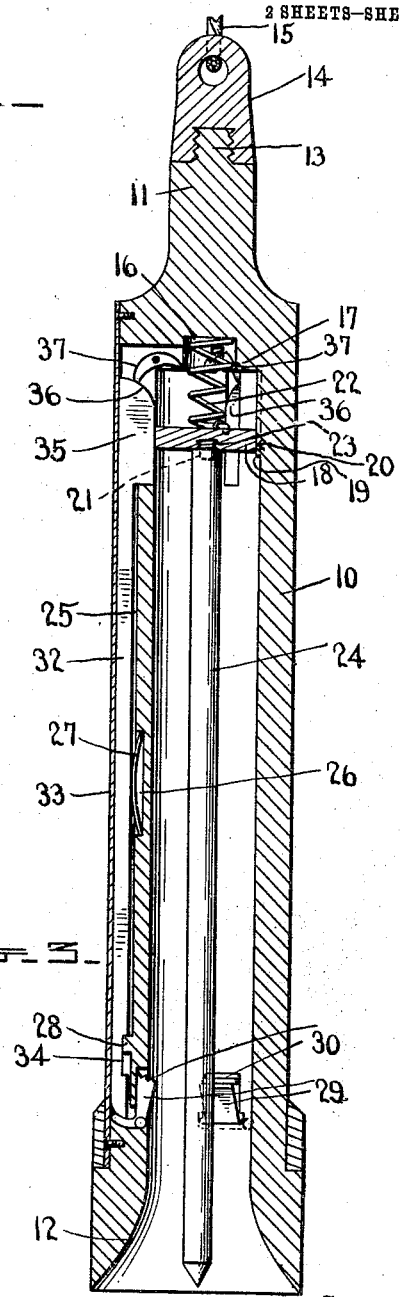
Witnesses
L. B. James
Henry T. Bright
Inventors
John T. Starr
B. M. McFarland
By
Attorneys J. T. STARR & B. M. McFARLAND.
FISHING TOOL.
APPLICATION FILED FEB. 6, 1911.
1,006,020.
Patented Oct. 17, 1911.
2 SHEETS—SHEET 2.
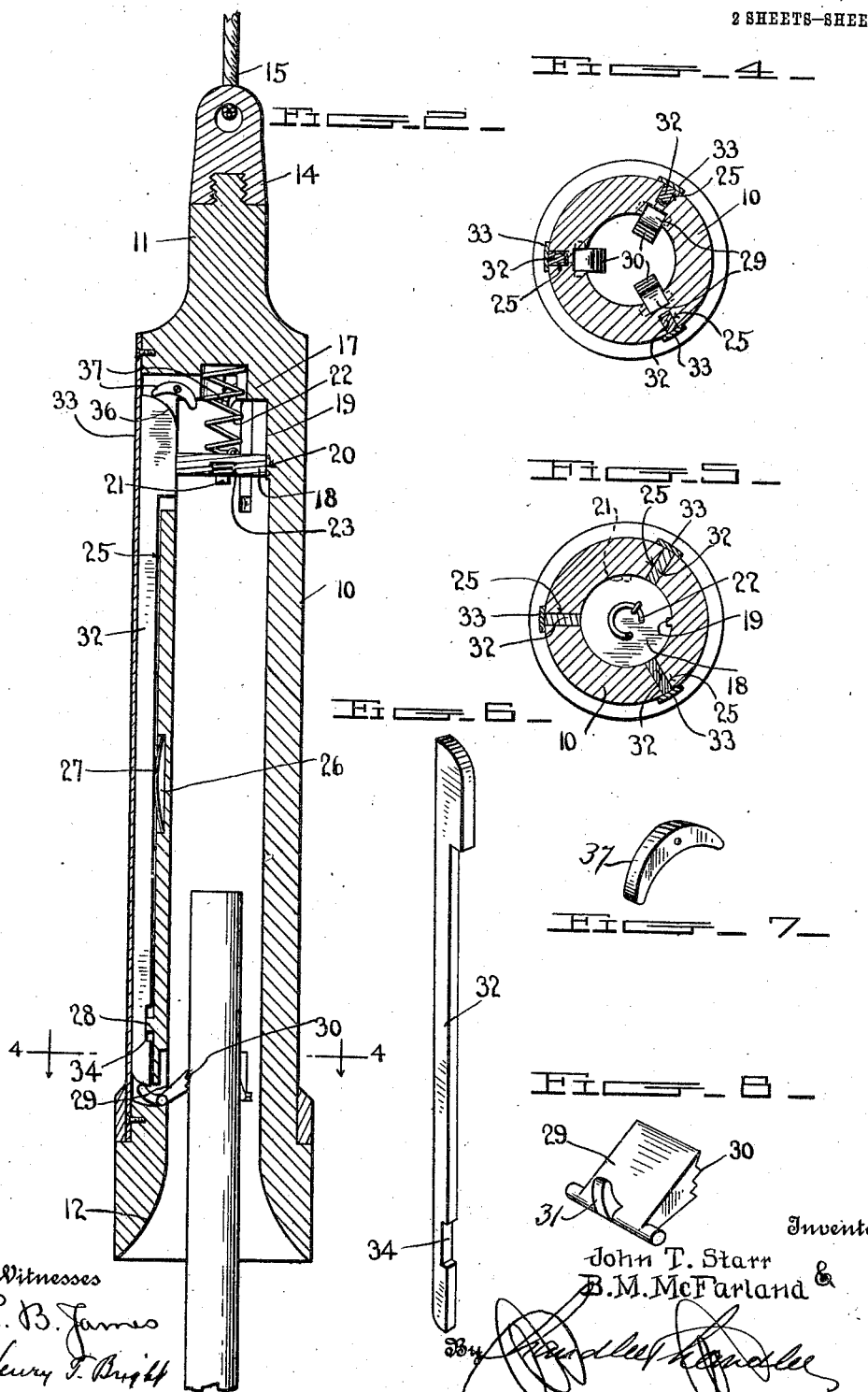
Witnesses
L. B. James
Henry T. Bright
Inventors
John T. Starr &
B. M. McFarland
By
Attorneys

UNITED STATES PATENT OFFICE.

JOHN T. STARR AND BENJAMIN M. McFARLAND, OF NOWATA, OKLAHOMA.

FISHING-TOOL.

1,006,020.      Specification of Letters Patent.      Patented Oct. 17, 1911.

Application filed February 6, 1911. Serial No. 606,884.

*To all whom it may concern:*

Be it known that we, JOHN T. STARR and BENJAMIN M. McFARLAND, citizens of the United States, residing at Nowata, in the county of Nowata, State of Oklahoma, have invented certain new and useful Improvements in Fishing-Tools; and we do hereby declare the following to be a full, clear, and exact description of the invention, such as will enable others skilled in the art to which it appertains to make and use the same.

This invention relates to fishing tools, and is particularly adapted for fishing out drills and tubes from oil wells, Artesian wells and other borings.

The object of the invention resides in the provision of a tool of the character named which may be lowered into a boring so as to receive a drill or tube therein and which when again elevated will automatically grip said drill or tube and effect the removal of the drill or tube from the boring simultaneously with the elevation of the tool.

A further object of the invention resides in providing a tool of the character named with means whereby it may be readily disengaged from a drill or tube in the boring so as to permit the removal of the tool when it has been found impossible to withdraw the drill or tube therewith.

With the above and other objects in view, the invention consists in the details of construction and in the arrangement and combination of parts to be hereinafter more fully described and particularly pointed out in the appended claims.

In describing the invention in detail, reference will be had to the accompanying drawings, wherein like characters of reference denote corresponding parts in the several views; and in which, Figure 1 is a side elevation of a tool constructed in accordance with the invention; Fig. 2, a vertical longitudinal section of the invention with the gripping jaws shown in active position and the tripping mechanism in inactive position; Fig. 3, a view similar to Fig. 2 with the gripping jaws moved to and held in inactive position through the medium of the tripping mechanism; Fig. 4, a section on the line 4—4 of Fig. 2; Fig. 5, a section on the line 5—5 of Fig. 1; Fig. 6, a detail perspective view of the slidable rod employed in the tripping mechanism; Fig. 7, a detail perspective view of the angle lever which co-acts with the slidable rod of the tripping mechanism; and, Fig. 8, a detail perspective view of one of the gripping jaws.

Referring to the drawings, the tool is shown as comprising a tubular body portion 10, having a closed upper end 11 and a flared open lower end 12. The closed upper end 11 is provided with a reduced threaded terminal 13, upon which is screwed a securing member 14 for the attachment of a hoist cable 15. The bore of the body portion 10 is reduced at its inner end as at 16, the reduction of said bore forming an annular shoulder 17 for a purpose that will presently appear. Slidably mounted in the major bore of the body portion 10 is a block 18 which is held against axial rotation by means of a rib 19 disposed longitudinally of the body portion 10 and entering a longitudinal recess 20 in the periphery of the block 18. The movement of the block 18 toward the open end of the body portion 10 is limited by means of a projection 21 extending into the major bore of the body, while the movement of the block 18 toward the closed end of the body is limited by means of the shoulder 17. A spring 22 is mounted between the block 18 and the closed end of the body, the inner end of said spring being seated in the reduced bore 16 and normally tending to hold said block in engagement with the shoulder 21; said spring in conjunction with the block 18 thereby forming a cushion upon which the tool is supported when lowered upon a drill or tube. The outer face of the block 18 is provided with a threaded recess 23 in which is adapted to be detachably secured a centering spear 24 for a purpose to be hereinafter referred to.

The body 10 is provided with three longitudinal grooves 25 in its outer face, said grooves opening into the major bore of the body at their upper and lower ends respectively. Each of these grooves has its inner wall provided with a recess 26 in which is mounted a bow spring 27 for a purpose that will hereinafter appear. The inner wall of each of these grooves is further provided with a projection 28 disposed between the recess 26 and the lower end of the groove. Pivotally mounted in the opening leading from the lower end of each groove into the major bore of the body is a gripping jaw 29, the free end of which carries gripping teeth 30. A finger 31 projects from the rear of the jaw 29 for engagement by a slidable rod 32 mounted in the groove 25. This rod is confined in said groove by means of a cover plate 33 secured to the outer face of the body 10 in any suitable manner. The inner side of the rod 32 is provided with a recess 34 which receives the projection 28 and this projection thus serves to limit the movement of said rod. The upper end of the rod is enlarged, as at 35 and its terminal is formed with a cam shape 36. Mounted in suitable recesses in the shoulder 17 are angle levers 37. These angle levers are so positioned that one arm thereof is adapted for coöperation with the cammed terminal 36 of a respective rod 32, while the other arm of said levers is adapted for coöperation with the block 18. The rod 32 is engaged by the spring 27 so that it will be held against accidental longitudinal movement during the normal operation and movements of the tool.

Assuming that the tool is gripping a drill and it is desired to let loose without elevating the latter, it is only necessary to drop the tool sharply upon the drill so that the upper end of the latter will engage the block 18 and force same toward the closed end of the body so as to engage and move the angle levers 37 from the position shown in Fig. 2 to the position shown in Fig. 3. This movement of the angle levers will cause the rods 32 to be moved downwardly and engage the respective fingers 31 and shift the gripping jaws to inactive position as illustrated in Fig. 3.

When the tool is used in connection with a tube, the spear 24 is utilized to enter the bore thereof and thus center same with respect to the tool.

What is claimed is:—

1. A tool of the class described, comprising a tubular member, a plurality of gripping jaws pivoted in the member and movable under the influence of gravity to active position, a trip mechanism for moving and holding said jaws to and in inactive position, and means operated by relative movement of the tool with respect to the work for actuating said trip mechanism.

2. A tool of the class described, comprising a tubular member, a plurality of gripping jaws pivoted in the member and movable under the influence of gravity to active position, a trip mechanism for moving and holding said jaws in and to inactive position, and slidable means operated by the movement of the work into the tool for actuating said trip mechanism.

3. A tool of the class described, comprising a tubular member having one end closed, a plurality of gripping jaws pivoted in the member and movable under the influence of gravity to active position, a block mounted in the bore of said tubular member and slidable longitudinally of the latter, a spring disposed between the closed end of the member and said block, whereby said block is moved in one direction under the influence of said spring and in the other direction by engagement with the work during its movement into the tool, and a trip mechanism for moving and holding said jaws to and in inactive position, said trip mechanism being actuated by the movement of said block under the influence of its engagement with the work.

In testimony whereof, we affix our signatures in presence of two witnesses.

JOHN T. STARR.
BENJAMIN M. McFARLAND.

Witnesses:
G. A. MARTIN,
A. POTHLEN.